Oct. 5, 1965    R. D. MOAN    3,209,620
TRANSMISSION
Filed Sept. 19, 1962    2 Sheets-Sheet 2
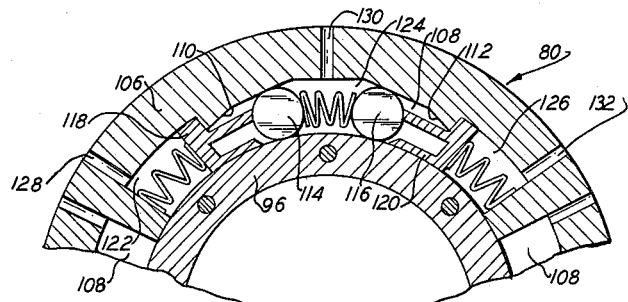
FIG.3
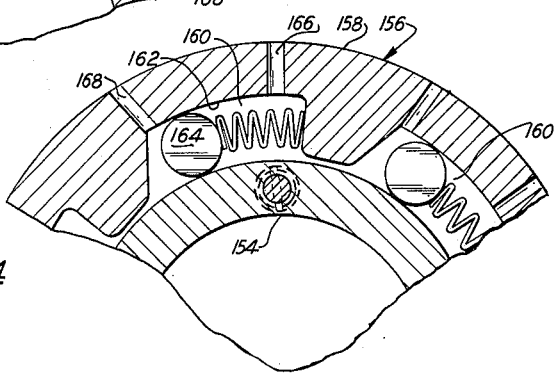
FIG.4
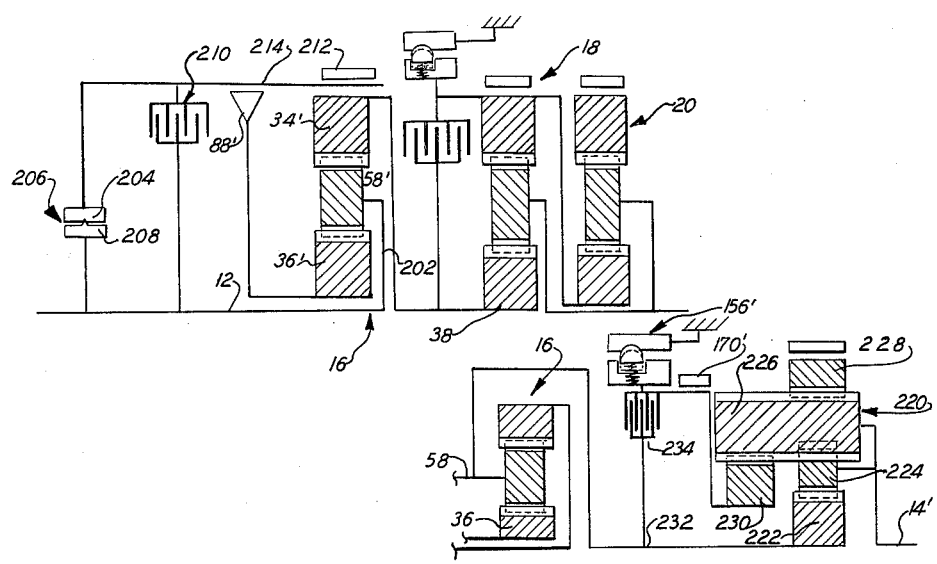
FIG.5
FIG.6
RICHARD D. MOAN
INVENTOR
BY
ATTORNEYS

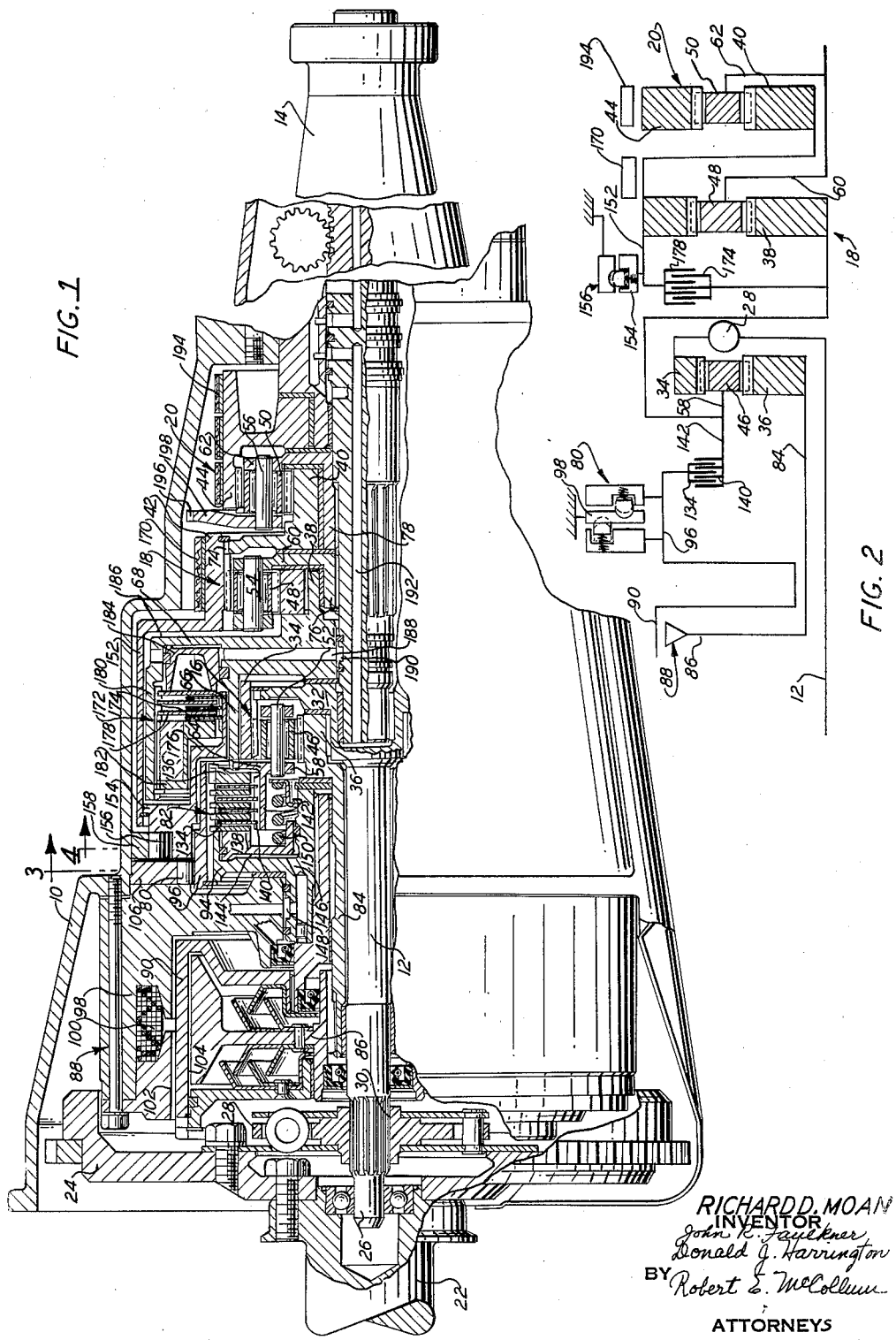

United States Patent Office 3,209,620
Patented Oct. 5, 1965

3,209,620
TRANSMISSION
Richard D. Moan, Dearborn, Mich., assignor to Ford Motor Company, Dearborn, Mich., a corporation of Delaware
Filed Sept. 19, 1962, Ser. No. 224,715
5 Claims. (Cl. 74—781)

This invention relates to a transmission for a motor vehicle, and more particularly to one combining a plurality of planetary gear sets with overrunning type brakes and friction disc type clutches and bands selectively engaged to provide four forward speed drive ratios of an output shaft, a reverse drive ratio, neutral, and coast or hill braking.

In planetary gear type transmissions, it is well known to use mechanical one-way type brakes to prevent rotation of selected gear set members in one direction of rotation to provide a reduction drive through the transmission. It is also known to provide fluid pressure operated bands or clutches for additionally holding the selected members stationary against rotation in either direction to prevent free-wheeling of the motor vehicle during coast and other conditions.

This invention is directed to a transmission construction eliminating the necessity of providing separate elements to control the rotation of a gear set member in any direction. It utilizes overrunning type devices having elements moved to a plurality of positions by fluid pressure to control the rotation in any direction of the gear set member to which it is connected. It combines in one device the control afforded previously only by several separately operated controls.

In a preferred embodiment, selective distribution of fluid under pressure to different parts of one of the overrunning devices prevents select gear set members from rotating in any direction, or in one direction or the other while permitting rotation in the opposite direction, or permits rotation in either direction.

Another one-way device is released by fluid under pressure, and can be engaged to prevent rotation of a gear set member in one direction with or without the use of fluid under pressure.

In alternative arrangements, the different one-way devices can be interchanged, or both be of the same type, as desired.

Therefore, it is an object of this invention to provide a transmission construction combining a plurality of planetary gear units with fluid pressure controlled overrunning devices and other type clutches and brakes to selectively establish a plurality of forward speed and reverse drive ratios, neutral, and coast braking through the transmission.

It is the further object of this invention to provide a planetary gear type transmission with fluid pressure operated overrunning brakes controlling the direction of rotation of the reaction members of the gear sets in any direction selectively to establish the various transmission drive ratios and neutral.

Furthermore, it is an object of this invention to provide control of transmission gearing by devices that are simplified in construction and economical to manufacture, and yet adjust themselves to any position called for in response to the different operating conditions of the transmission by the selective distribution of fluid pressure to different parts of the devices.

Other objects, features and advantages of the invention will become apparent upon reference to the succeeding detailed description of the invention, and to the drawings illustrating the preferred embodiments thereof; wherein, FIGURE 1 is a cross-sectional view of a transmission embodying the invention;

FIGURE 2 is a schematic illustration of the transmission of FIGURE 1;

FIGURES 3 and 4 are enlarged cross-sectional views of portions of details taken on planes indicated by and viewed in the direction of the arrows 3—3 and 4—4 of FIGURE 1;

FIGURE 5 is a schematic illustration of a modification of the transmission of FIGURES 1 and 2; and, FIGURE 6 is a schematic illustration of another modification of the transmission of FIGURES 1 and 2.

FIGURE 1, which is essentially to scale, shows a bell-shaped transmission housing 10 open at opposite ends enclosing and supporting the transmission embodying this invention. In general, the transmission has an input shaft 12 connected to an output shaft 14 through three sets of planetary gear units 16, 18 and 20. The first two units 16 and 18 are variably controlled by the use of fluid pressure controlled overrunning brakes, bands and clutches to provide four forward speed drive ratios, neutral, and coast or hill braking, while the unit 20 is utilized to provide a reverse drive ratio.

More specifically, the open forward end of housing 10 receives an output shaft 22 from a motor vehicle type engine (not shown), the shaft having a conventional flywheel 24 bolted to it. Shaft 22 telescopically receives the end 26 of the transmission drive shaft 12, and the two shafts are connected by a known type of vibration damper 28. The damper is bolted to the fly-wheel and has a splined connection at 30 to shaft 12.

Shaft 12 extends centrally through the housing 10 and has a radial flange 32 formed integrally on its rearward end. The flange is splined to the ring gear 34 of the first gear unit 16.

Each of the gear units 16, 18, and 20 is of the simple planetary type having a sun gear 36, 38, 40 and a ring gear 34, 42, 44, both meshing with a set of spaced planet pinions 46, 48, 50. The pinions of each set are rotatably mounted on shafts 52, 54, 56 fixed to a carrier member 58, 60, 62.

Carrier 58, which is the output member of unit 16, is fixed to the second unit sun gear 38 by a splined connection between a radial extension 64 of the carrier, and an axial extension 66 of a rotatable housing 68. Sun gear 38 is formed as an integral part of the housing. The housing is rotatably mounted on output shaft 14 and located axially by suitable bearing members as shown.

The second unit ring gear 42 is fixed for rotation with the third or reverse unit sun gear 40 by a splined connection at 74. The carriers 60 and 62 of both units 18 and 20 are radially extended and formed with hubs 76 and 78 splined to the output shaft 14. The sun gears 38 and 40 are rotatably mounted on the carrier hubs and, along with the carriers and ring gear 44, are located both axially and radially by suitable bearing members in the manner shown. Ring gear 44 is thus mounted for a free rotation with respect to the housing 10.

Low speed forward drive is established by conditioning both gear units 16 and 18 for a reduction drive.

Second speed forward drive is established by locking up the gear unit 16 to provide a direct drive through this unit, while maintaining the unit 18 conditioned for a reduction drive.

Third speed is obtained by conditioning the gear unit 16 for a reduction drive while locking up the unit 18 for a direct drive.

Fourth speed or direct drive is established by conditioning each of gear units 16 and 18 for a direct drive.

During all of the forward speed drives, the reverse unit 20 merely idles.

Reverse is established by conditioning both the unit 16 and the reverse unit 20 for a reduction drive, the second unit 18 being free to revolve.

The different drives are established by means of a number of selectively operated fluid pressure controlled overrunning brakes, bands and clutches.

In the first unit 16, the sun gear 36 normally acts as the reaction member. To condition this unit for a reduction drive, the sun gear can be held against rotation in one direction or the other or both by a double-acting overrunning brake 80. To condition the unit for a direct drive, a clutch 82 between the sun gear and carrier 58 can be engaged, the clutch 80 overruning at this time.

More specifically, the sun gear is formed as a part of a sleeve shaft 84 surrounding input shaft 12. The sleeve shaft is splined to one rotatable member 86 of a known type of magnetic particle clutch 88. The other rotatable member 90 of clutch 88 is splined to the housing 94 of clutch 82, which also serves as the inner race 96 of the overrruning brake 80. Clutch member 90 is positioned radially between a stationary field member 98 on one side containing a coil 100, and the clutch member 86 on the other side. A controlled air gap 102 is thus provided on one side of the clutch drive member, while a magnetic powder gap 104 exists on the other side. Further details of the clutch will not be given since they are known and believed to be unnecessary for an understanding of the invention. Suffice it to say, that varying the amount of current to coil 100 from or towards zero will vary the relative rotation between the two clutch members 90 and 86. The clutch primarily is for providing a smooth acceleration or deceleration of sun gear 36 from or to a state of rest. This is to prevent communicating a jarring sensation to the vehicle operator that frequently occurs at the time of engagement of a friction disc type clutch, for example, when it quickly clutches two relatively rotating parts together.

The overrunning brake 80 (FIGURE 3) has an outer race 106 mounted in and fixed to the transmission housing 10. It has a number of recesses 108, each having tapered cam surfaces 110 and 112 on its outer diameter. The cam surfaces cooperate with two spring separated rollers 114 and 116 each engaged by a spring biased phasing member 118 and 120. The recesses, inner race, phasing members and rollers thus define fluid pressure chambers 122, 124 and 126 adapted to be selectively supplied with fluid under pressure through three fluid passages 128, 130 and 132 in the outer race.

In operation, fluid exhausted from all of the chambers or supplied to all of them simultaneously permits the springs to move the rollers to the positions shown, out of wedging engagement with inner race 96. Thus, the inner race may rotate freely in either direction. Application of fluid pressure through passage 130 alone will move both rollers into engagement with the inner and outer race preventing rotation of the inner race in either direction. Fluid pressure admitted through passages 128 and 130 alone causes roller 114 to disengage and roller 116 to engage to prevent clockwise rotation of the inner race while permitting counterclockwise rotation. This same result can be accomplished by supplying fluid through passage 128 alone. Conversely, fluid through passages 130 and 132 alone, or passage 132 alone engages roller 114 while disengaging roller 116 to prevent counterclockwise rotation of inner race 96, while permitting clockwise rotation.

Further details of this overruning brake and its operation may be obtained by reference to U.S. Patent No. 3,054,488, Fluid Pressure Operated Overruning Coupling, General et al.

Thus, it will be seen that with the magnetic clutch 88 engaged, the overrunning brake can hold sun gear 36 stationary in both directions at all times, or in one direction or the other while permitting it to rotate in the opposite drection, or release it to rotate in either direction, to condition the gear unit 16 for various reduction drives, simply by the selective distribution of fluid pressure through the different passages of the overrunning brake.

As stated previously, the sun gear 36 and carrier 58 can be locked together by clutch 82 to provide a direct drive through the gear unit 16. The clutch has one set of friction discs 134 splined to the clutch housing 94, serving also as inner race 96 of the overrunning brake 80, the discs being positioned between a backing member 136 and a movable piston 138. The other set of alternating discs 140 are splined to an axial extension 142 of carrier 58. Piston 138 is mounted within a recess in the clutch housing 94, and a fluid chamber 144 is defined between the two. Fluid under pressure is supplied to chamber 144 through passages 146 and 148 from an engine driven pump (not shown) to effect engagement of the clutch, while a spring 150 effects disengagement.

In the second gear unit 18, the ring gear 42 normally acts as the reaction member. To condition this unit for a reduction drive, the ring gear has a drum extension 152 fixed to the inner race 154 of a second overrunning brake 156. When engaged, the brake prevents rotation of the gear in a counterclockwise or reverse direction as viewed from the left of FIGURE 1.

Brake 156 has a slightly different construction than brake 80, as best seen in FIGURE 4. The outer race 158 is mounted within and fixed to housing 10, and contains spaced recesses 160. Each recess has a cam surface 162 adapted to be engaged by a roller 164 spring urged against the surface to lock the inner race 154 against counterclockwise rotation, while permitting clockwise rotation. Race 154 can also be locked against counterclockwise rotation by application of fluid under pressure through passage 166 in the outer race. The inner race is released for rotation in either direction by passage of fluid through a passage 168 only.

Further details of the brake may be obtained by reference to U.S. Patent No. 3,134,471, Fluid Pressure Actuated Clutch or Brake, Howard L. Crosswhite.

Ring gear 42 can also be held against rotation in either direction by application of a fluid pressure operated band 170 (FIGURES 1 and 2). This is useful to prevent run-away of the output shaft during coasting in first and second speed operations when the brake 156 normally overruns.

The ring gear 42 can also be clutched directly to the sun gear 38 by a clutch 172 to condition gear unit 18 for a direct drive. The clutch has one set of friction discs 174 splined to an extension 176 of the inner race 154 of brake 156, which is fixed to ring gear 42. The alternating set of discs 178 is splined to a drum-like extension 180 of the rotatable housing 68 and sun gear 38 between a back-up member 182 and a number of pistons 184 mounted in the housing. Fluid pressure supplied to the chamber 186 between the pistons and housing applies the clutch, and it is released by suitable springs, not shown. The fluid for chamber 186 can be supplied from the engine driven pump through a bore 188, connecting passages 190 and 192, and a control valve or valves, not shown.

The reverse gear unit 20 is used for producing a reverse reduction drive and parking only. Ring gear 44 acts as the reaction member and is held against rotation in either direction by a fluid pressure actuated band 194 surrounding the gear. If braking of the output shaft 14 is desired, a parking pawl (not shown) is actuated to engage teeth 196 on a radially extending portion 198 of carrier 62.

OPERATION

In connection with the operation, by "forward" rotation, is meant clockwise rotation of the input shaft and other members as viewed from the left side of FIGURE 1; whereas, by "rearward" or "reverse" rotation is meant counterclockwise rotation.

*Neutral (FIGURES 1 and 2)*

To establish this condition, it is only necessary to release fluid pressure from the double acting overrunning brake 80 to permit its springs to position rollers 114 and 116 allowing free rotation of the inner race 96. Accordingly, a forward drive from input shaft 12 to ring gear 34 will freely rotate sun gear 36 in a reverse direction, the carrier 58 at this time being stationary. The front unit 14 therefore merely rotates idly without producing any drive of the carrier 58. If preferred, if the parking pawl is not engaged, the rear one-way brake 156 may be maintained engaged, conditioning gear unit 18 for a reduction drive and therefore offering a resistance to forward movement of the output shaft 14.

*Forward*

First or low speed is established by engaging clutch 88 and overrun brakes 80 and 156. The overrun brakes are selectively actuated to prevent only reverse rotation of sun gear 36 and ring gear 42. Thus, forward rotation of input shaft 12 rotates ring gear 32 forwardly. With the carrier stationary, sun gear 36 attempts to rotate in a reverse direction but is prevented by the overrun brake 80, thereby causing a slow forward rotation of carrier 58 to drive sun gear 38 of the second gear unit 18 forward slowly. Reverse rotation of ring gear 42 being prevented, carrier 60, and therefore output shaft 14, are rotated forwardly slowly at a speed according to the reduction ratios of the two gear units 16 and 18. The reverse gear unit 20 at this time merely idles freely.

If, at this time, a coast condition occurs, i.e., output shaft 14 becomes the driver, normally, the brakes 80 and 156 would overrun providing no engine braking to the output shaft.

To prevent this, brake band 170 can be applied to hold ring gear 42 stationary. If greater braking is desired, fluid pressure applied to passage 130 only of brake 80 will hold sun gear 36 stationary. Both units 16 and 18 are then maintained conditioned for reduction drive, and engine braking is effected.

For second speed operation, front unit clutches 82 and 88 are engaged. The front brake 80 permits sun gear 36 to rotate forwardly, and the rear unit brake 156 remains engaged to prevent reverse rotation of ring gear 42. A direct drive is therefore established through gear unit 16, while the rear unit 18 remains conditioned for a reduction drive. Coast braking can be obtained by applying band 170 or by disengaging clutch 82 and conditioning brake 80 to prevent forward rotation of sun gear 36.

For third speed operation, the front unit 16 is placed in reduction in the manner disclosed in connection with first speed. The rear unit 18, however, is locked up for a direct drive by clutch 172 connecting sun gear 38 and ring gear 42, the clutch 156 overrunning. Coast braking can be effected by supplying fluid pressure to the front overrun brake 80 to prevent rotation of sun gear 36 in a forward direction.

For fourth speed or direct drive, the front and rear units are both locked up by engaging clutches 82, 88 and 172, while permitting brakes 80 and 156 to overrun.

*Reverse*

Reverse drive is obtained by applying the reverse brake band 194, clutch 88, and the front overrun brake 80 to prevent any rotation of sun gear 36. Brake 156 is pressure released. The forwardly rotating sun gear 38 drives ring gear 42 reversely about the relatively stationary carrier 60 to drive the reverse unit sun gear 40 in a reverse direction. The carriers 60 and 62, and therefore output shaft 14, are driven reversely. Coast braking is provided by the reduction drive established in the front unit 16 due to the inability of the sun gear 36 to rotate in any direction.

It is within the scope of the invention to substitute a double acting one-way brake of a construction like that of brake 80 for the single acting pressure released brake 156 and the coast brake band 170, since the same results would be accomplished. Conversely, it is also within the scope of the invention to replace overrun brake 80 with a pressure released overrun brake of a construction like that of brake 156, with the addition of a coast brake band.

FIGURE 5 shows a modification of the transmission described, wherein the reduction drive-direct drive first gear set 16 of the FIGURES 1 and 2 showings, is replaced by a direct drive-overdrive gear unit. In all other respects, FIGURE 5 corresponds to the showings in FIGURES 1 and 2. In FIGURE 5, shaft 12 is connected to the carrier 58′ of gear set 16′ by a drive connection 202. Ring gear 34′ is directly connected to sun gear 38 of unit 18. Sun gear 36′ is connected through a magnetic particle clutch 88′ to the outer race 204 of an overrunning clutch 206, the inner race 208 of which is directly connected to drive shaft 12. With ring gear 34′ substantially stationary because of its connection to the rear gear set, drive of carrier 58′ by shaft 12 effects a forward or clockwise overspeed of sun gear 36′ to lockup clutch 204 by means of engaged clutch 88′. The gear set 16′ is therefore locked up for a direct drive since the sun gear 34′ and carrier 58′ are being driven at the same speed. The sun gear and drive shaft may also be connected by a fluid pressure actuated clutch 210 to prevent free wheeling of the sun gear in a reverse direction during vehicle coast conditions. The gear unit is conditioned for an overdrive by the application of a brake band 212 to one member 214 of the magnetic particle clutch 88′. Application of band 212 and energization of clutch 88′ therefore holds sun gear 36′ stationary, clutch 206 overrunning at this time. Forward rotation of carrier 58′ therefore overspeeds output ring gear 36′.

Since the operation of the rear units 18′ and 20′ have already been described in connection with FIGURE 1, the details would not be repeated. Suffice it to say, however, that the front unit 16′ is conditioned for a direct drive for first and third and reverse operation, while being conditioned for an overdrive to establish second and fourth speed drives. Coast braking may be provided in first and third speeds by application of clutch 210.

FIGURE 6 shows another modification of the transmission of FIGURES 1 and 2, wherein the rear and reverse unit gear sets 18 and 20 of FIGURE 1 have been replaced by one dual planet pinion gear arrangement 220. A small diameter sun gear 222 meshes with a series of planet pinions 224 in turn meshing with long planet pinions 226 engaging both a ring gear 228 and a larger diameter sun gear 230. The small input sun gear 222 is secured to the carrier 58′ of the gear unit 16 of FIGURE 1 by a connection 232. For a reduction drive, sun gear 230 is held against reverse rotation by the pressure releasable one-way brake 156′, or in both directions by the coast brake band 170′. For direct drive through this gear unit, a fluid pressure actuated friction clutch 234 connects sun gears 222 and 230 to lock up the gear set.

Except for the slightly different drive and speed ratio provided by gear set 220, the clutches, bands, one-way brakes, and front unit 16 operate in the same manner as described in connection with FIGURES 1 and 2. Therefore, only the operation of the modified rear unit 202 will be described.

In first and second speed drives, one-way brake 156′ is engaged preventing reverse rotation of sun gear 230, while permitting forward rotation. The forward drive of sun gear 222 drives output shaft 14′ forwardly at a reduced speed according to the gear ratio of this unit 220. Coast braking is effected by the application of band 170′. For third and fourth speed drives, clutch 234 is engaged to provide a direct drive through gear unit 220, the brake 156′ overrunning.

As in the case of the FIGURES 1 and 2 showings, it is within the scope of the invention to replace the separate one-way releasable brake 156′ and coast brake band 170′ with a single double acting one-way brake identical to the front unit overrun brake 80. The results would be the same as controlled by the distribution of fluid to the brake 216.

While the invention has been illustrated in connection with a transmission of the planetary gear type, it will be clear to those skilled in the arts to which the invention pertains that it would have uses in many installations other than that shown, and that many changes may be made thereto without departing from the scope of the invention.

I claim:

1. A transmission having an input shaft, an output shaft, and means drivingly connecting said shafts, said means including a planetary gear unit having drive and driven and reaction and other rotatable members, means connecting the drive member to said input shaft, means connecting the driven member to said output shaft, and a selectively operable brake means operatively connected to the reaction member of said gear unit, said latter operative connection including a selectively operable electromagnetic clutch means when operable providing an infinitely variable engagement or release of said reaction member with respect to said brake means for effecting smooth transmission drive changes, the selective operation of said brake means holding said reaction member stationary to permit establishment of one drive through said transmission, or releasing said brake means to permit establishment of another drive through said transmission, and selectively operable direct drive clutch means between one of said driven and driving members and said electromagnetic clutch means when operable permitting establishment of a direct drive through said gear unit.

2. A transmission having an input shaft, an output shaft, and means drivingly connecting said shafts, said means including first and second interconnected planetary gear units each having drive and driven and other rotatable members, means connecting the drive member of the first gear unit to said input shaft, means connecting the driven member of said second gear unit to said output shaft, means connecting the driven member of said first gear unit to the drive member of said second gear unit, and a plurality of selectively operable brake means operatively connected to reaction members of each of said gear units for holding selected ones of said reaction members stationary to provide a reduction drive through said transmission, or releasing selected ones of said gears for rotation to permit establishment of different drives through said transmission, said operative connection to the first unit reaction gear including a selectively operable electromagnetic clutch means providing an infinitely variable engagement for smoothly connecting or disconnecting said brake means and first unit reaction member to provide smooth changes between the transmission drives, and direct drive clutch means between said electromagnetic clutch means and one of said first unit driving and driven members operable upon release of said brake means and operation of said latter clutch means to establish a direct drive through said first gear unit.

3. A transmission having an input shaft, an output shaft, and means drivingly connecting said shafts, said means including first and second interconnected planetary gear units each having sun and ring gears, and a planet carrier, means connecting the ring gear of the first gear unit to said input shaft, means connecting the carrier of said second gear unit to said output shaft, means connecting the carrier of said first gear unit to a sun gear of said second gear unit, and a plurality of selectively operable brake means operatively connected to the sun gear of said first gear unit and to the ring gear of said second gear unit for holding selected ones of said gears stationary or releasing individual ones of said gears for rotation, to permit establishment of different drives through said transmission, said operative connection to the first unit sun gear including a selectively operable electromagnetic clutch means for providing an infinitely variable engagement or release of said brake means and sun gear for smooth transmission drive changes, and selectively operable direct drive clutch means between said first unit carrier and said electromagnetic clutch means for locking up said first gear unit upon release of said brake means and operation of said electromagnetic means.

4. A transmission having power input and output shafts, and means drivingly connecting said shafts, said means including a planetary gearset having drive and driven and other rotatable elements, means connecting said input shaft to said drive member, means connecting said driven member to said output shaft, and means for conditioning said gearset for a direct drive or a different drive therethrough, said latter means including a pair of serially connected clutch means including a one-way clutch for preventing faster rotation of said another member in one direction relative to said input shaft during engagement of the other of said clutch means to thereby lock up said gearset, said other clutch means comprising a selectively operable and progressively engageable clutch means connecting said another member to said one-way clutch in a progressive manner providing smooth connections and disconnections therebetween, and means to prevent rotation of said another member in the other direction during engagement of said other clutch means to condition said another member as a reaction member to establish a different drive through said gearset.

5. A transmission having power input and output shafts, and means drivingly connecting said shafts, said means including a planetary gearset having sun and ring gears and a planet carrier and other rotatable elements, means connecting said input shaft to said carrier, means connecting said ring gear to said output shaft, and means for conditioning said gearset for a direct drive or a different drive therethrough, said latter means including a plurality of serially connected clutch means operably connecting said sun gear to said input shaft, said clutch means including an overrunning clutch preventing faster rotation of said sun gear in one direction relative to said input shaft during engagement of the remaining of said plurality of clutch means to lock up said gearset, said clutch means also including selectively operable electromagnetic clutch means between said sun gear and said overrunning clutch operable in an infinitely progressive manner to provide smooth accelerations and decelerations of said sun gear, selectively operable brake means to prevent rotation of said sun gear in the other direction during engagement of said electromagnetic clutch means to condition said sun gear as a reaction member to establish a different drive through said gearset, and further selectively operable clutch means connecting opposite sides of said overrunning clutch for providing a positive one-way drive of said sun gear when said electromagnetic clutch means is engaged and said brake means inoperable.

References Cited by the Examiner

UNITED STATES PATENTS

| | | | |
|---|---|---|---|
| 1,807,035 | 5/31 | Herman | 192—44 X |
| 2,001,668 | 5/35 | Maier | 192—44 X |
| 2,023,018 | 12/35 | Hamilton | 74—781 |
| 2,106,905 | 2/38 | Barnes | 74—781 X |
| 2,260,846 | 10/41 | Voytech | 74—781 |
| 2,343,509 | 3/44 | Jandasek | 74—782 |
| 2,355,876 | 8/44 | Lazaga | 74—688 |
| 2,606,459 | 8/52 | Carnegie | 74—761 X |
| 2,943,516 | 7/60 | Herndon | 74—761 X |
| 3,054,488 | 9/62 | General et al. | 192—44 |
| 3,084,774 | 4/63 | Liang | 192—44 |
| 3,088,339 | 5/63 | Black | 74—677 X |
| 3,108,495 | 10/63 | Winchell | 74—761 |

DON A. WAITE, *Primary Examiner.*